United States Patent [19]

Smith

[11] Patent Number: 4,948,293

[45] Date of Patent: Aug. 14, 1990

[54] CONNECTOR APPARATUS AND METHOD FOR MANUFACTURING AN IRRIGATION APPARATUS

[76] Inventor: Allan L. Smith, P.O. Box 428, Exeter, Calif. 93221

[21] Appl. No.: 238,139

[22] Filed: Aug. 30, 1988

[51] Int. Cl.$^5$ .............................................. A01G 25/00
[52] U.S. Cl. ...................................... 405/36; 239/542; 405/51
[58] Field of Search ....................... 405/36, 43, 45, 37; 239/542, 547; 138/104, 105, 120, 121, 138, 155, 125, 174; 47/1, 48.5

[56] References Cited

U.S. PATENT DOCUMENTS

| | | |
|---|---|---|
| 648,263 | 4/1900 | Hull . |
| 717,042 | 12/1902 | Smith .............................. 239/547 X |
| 1,659,470 | 2/1928 | Owen et al. . |
| 1,964,097 | 6/1934 | Van Doren .......................... 239/547 |
| 2,066,531 | 1/1937 | Holden . |
| 2,332,350 | 10/1943 | Scritchfield . |
| 3,091,401 | 5/1963 | Hruby .............................. 239/547 X |
| 3,361,363 | 1/1968 | Babington ...................... 239/547 X |
| 3,425,630 | 2/1969 | Fessler . |
| 3,632,048 | 1/1972 | Light .................................... 239/547 |
| 3,729,142 | 4/1973 | Rangel-Garza et al. . |

Primary Examiner—Dennis L. Taylor
Attorney, Agent, or Firm—Worrel & Worrel

[57] ABSTRACT

A connector apparatus for connecting a work object in fluid communication with a first conduit which has a wall having an orifice formed therein, the apparatus including a first portion mounting a locking member, a second portion having a channel formed therein and a second locking member engageable with the first locking member for securing the first and second portions together, the first conduit secured between the first and second portions and a second conduit slidably received in the channel and in the orifice, and the work object mounted in fluid communication therewith, the second conduit connecting the work object in fluid communication with the first conduit. The invention also relates to a method for manufacturing an irrigation apparatus which includes the steps of determining the desired locations for sprinklers, making the conduit, marking the conduit so as to control positioning thereof and attaching connector apparatuses at the desired locations for the sprinklers.

8 Claims, 3 Drawing Sheets

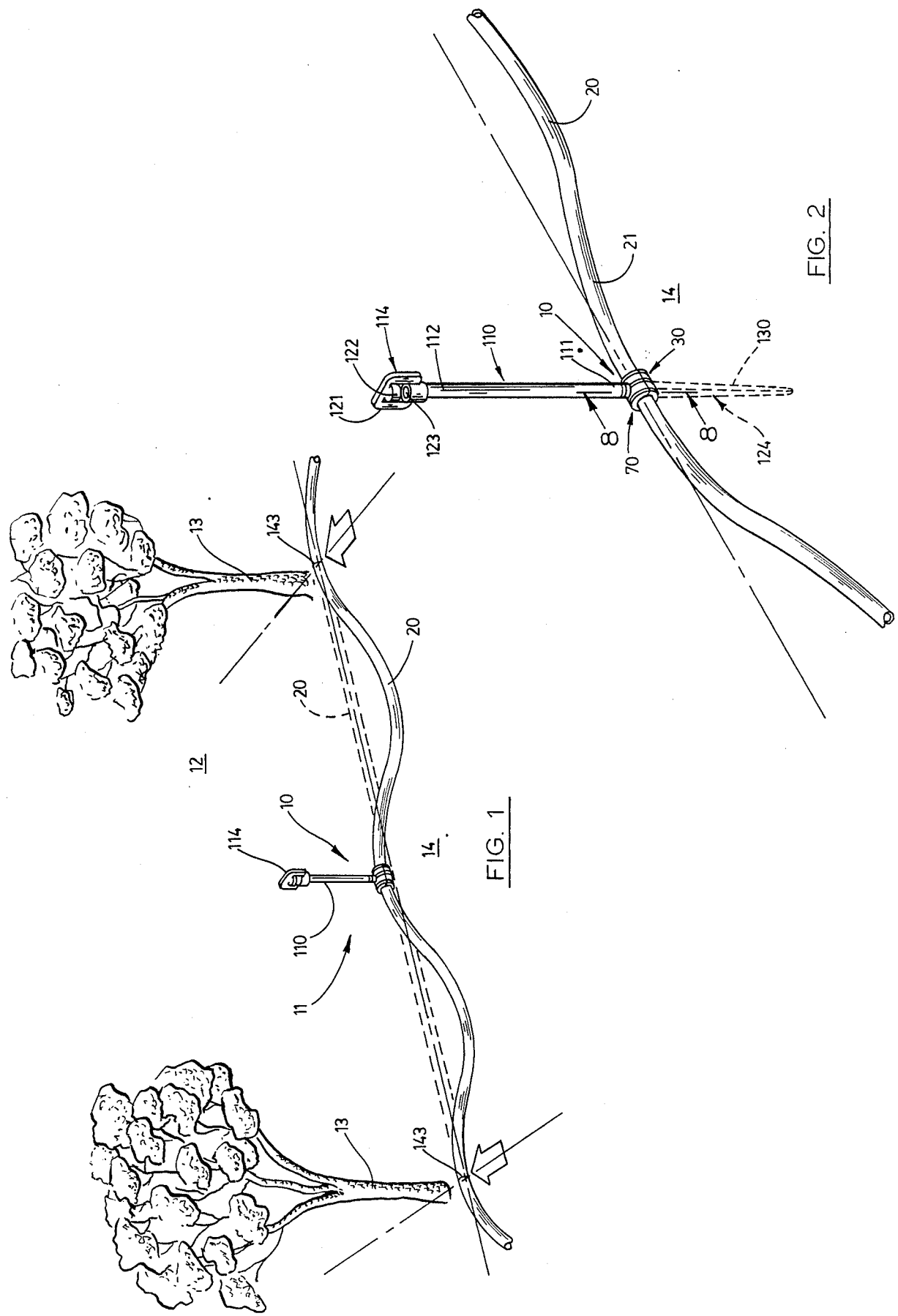

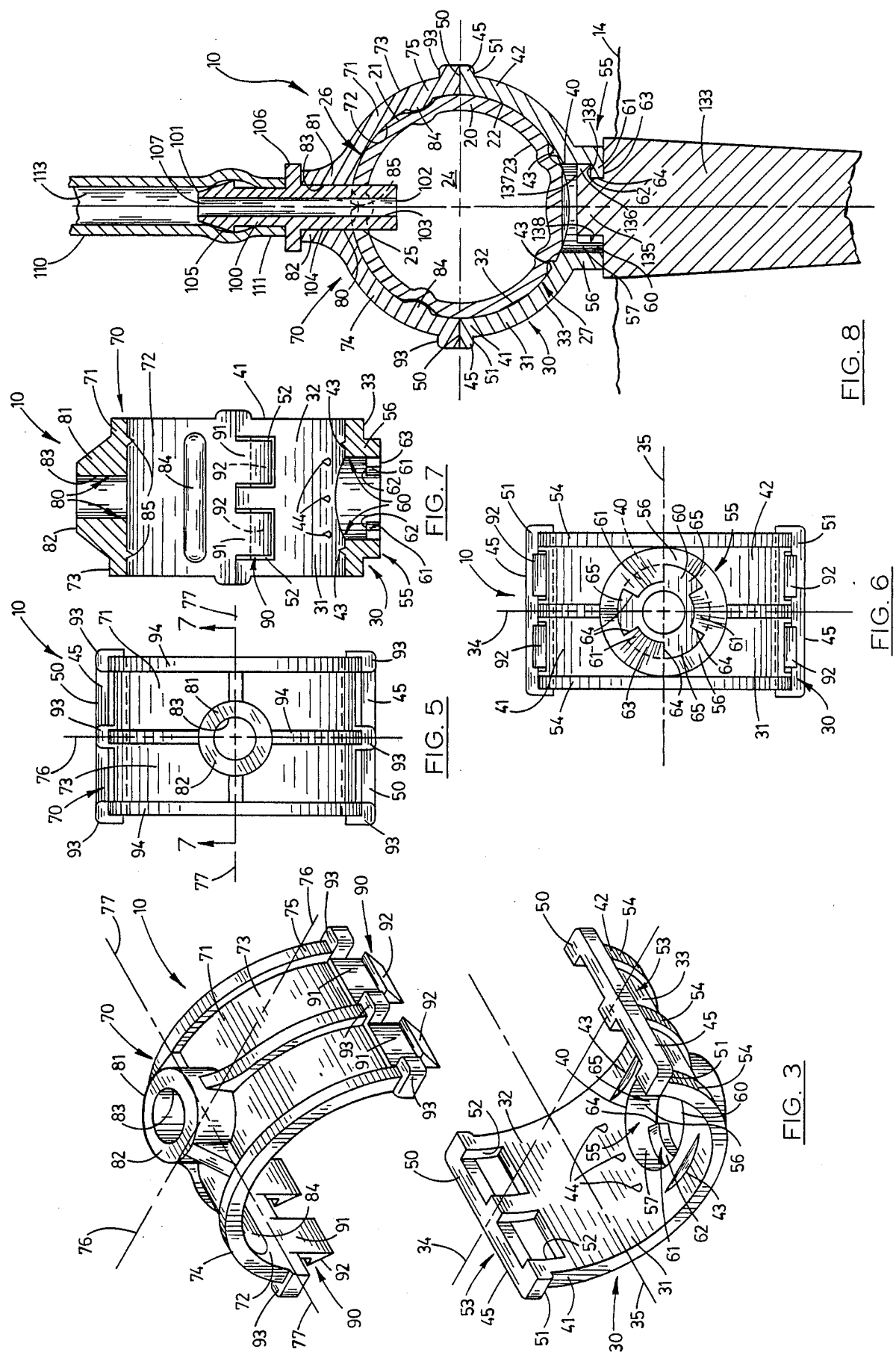

CONNECTOR APPARATUS AND METHOD FOR MANUFACTURING AN IRRIGATION APPARATUS

BACKGROUND OF THE INVENTION

1. Field of the Invention:

The present invention relates to a connector apparatus for coupling a work object in fluid communication with a conduit and to a method for manufacturing an irrigation apparatus and more particularly to a connector apparatus which, when properly mounted on a conduit, has utility in locating a sprinkler in a selected attitude relative to an agricultural area for the performance of irrigation operations, the connector apparatus further permitting the installation of an entire irrigation system in an agricultural area with increased speed, accuracy, and dependability not possible heretofore.

2. Description of the Prior Art:

The beneficial effects of employing variously designed sprinklers for purposes of performing the assorted irrigation tasks associated with the cultivation of specific varieties of crops have long been known. While sprinklers of assorted designs have operated with varying degrees of success, they commonly possess shortcomings which have detracted from their usefulness. For example, in the conventional installation of irrigation systems for use in commercial orchards, lengths of irrigation conduit are laid on the earth and disposed in close proximity to the rows of trees, and sprinklers are later connected in fluid communication thereto by employees, using assorted hand tools, at desired locations. While this practice appears logical and is considered the most field expedient, numerous problems arise as a consequence of its utilization.

The first difficulty which occurs from the utilization of this prior art practice normally can be attributed to the materials from which the conduit is manufactured. In the case of the assorted polymer materials typically utilized in manufacturing conduit for such irrigation installations, it has long been known that such conduit will experience some stretching and twisting as a direct consequence of installation. After installation, this same conduit will eventually recover to its relaxed length. However, in the process of recovering to the relaxed length, the sprinkler will often be drawn out of position, become disoriented, and may otherwise become partially ineffective. Moreover, this problem may be exacerbated by the expansion and contraction of the conduit which occurs when the conduit is exposed to high and low ambient air temperatures, radiant solar energy and the like.

Still other significant problems exist with the prior art devices and practices. For example, the prior art practice of installing such irrigation systems requires that the coupling of the sprinklers on the conduit take place following the installation of the conduit in the agricultural area. This practice creates a host of problems which are related to the use of hand tools in a field environment. These difficulties often include positioning the water connection holes in the wrong location, creating water connection holes which have rough edges that inhibit the individual sprinkler devices from properly sealing to the conduit thereby creating leaks, tearing the conduit and accidentally creating double water connection holes when the tool forming same is driven completely through the conduit. In addition to the aforementioned problems, the previous practice is labor intensive and therefore quite expensive.

Therefore, it has long been known that it would be desirable to have a connector apparatus and a method for manufacturing irrigation apparatuses which have particular utility in coupling sprinklers in fluid communication with a conduit, the apparatus operable substantially to reduce the time and labor required to install an irrigation system utilizing such sprinklers while simultaneously increasing the effectiveness thereof with the attendant benefits to be derived from such effective irrigation operations.

SUMMARY OF THE INVENTION

Therefore, it is an object of the present invention to provide an improved connector apparatus.

Another object of the present invention is to provide an apparatus which has particular utility when coupling a work object in fluid communication with a suitable conduit.

Another object of the present invention is to provide such an apparatus which can be easily installed in selected positions along a length of conduit at the time the conduit is manufactured and to provide a method of manufacture having particular utility therein.

Another object of the present invention is to provide such an apparatus which, when properly installed on an appropriate conduit, is adapted to position the work object in a predetermined substantially fixed position relative to a work surface.

Another object of the present invention is to provide such an apparatus which permits the work object readily to disengage therefrom in response to impact.

Another object of the present invention is to provide a method for manufacturing an irrigation apparatus.

Another object of the present invention is to provide a method for manufacturing an irrigation apparatus wherein the connector apparatus is operable to join a sprinkler in fluid communication with a conduit and is affixed at predetermined locations and attitudes along the length of the conduit shortly after the conduit is manufactured.

Another object of the present invention is to provide a method for manufacturing an irrigation apparatus wherein a plurality of reference marks are individually placed at predetermined locations on the conduit during the manufacture thereof, the individual reference marks indicating the location of that portion of the conduit relative to a selected plant to be irrigated.

Another object of the present invention is to provide a method for manufacturing an irrigation apparatus wherein the irrigation system is manufactured in accordance with customer specifications, and is ready for installation upon completion of the manufacturing process.

Another object of the present invention is to provide a method for manufacturing an irrigation apparatus wherein the sprinklers remain substantially vertically disposed, and correctly positioned notwithstanding expansion and contraction of the conduit.

Another object of the present invention is to provide a connector apparatus which is characterized by simplicity of design, ease of employment and installation, and which can be sold at a relatively nominal price.

Another object of the present invention is to provide a connector apparatus, and a method of manufacturing an irrigation apparatus, which are operable to obtain the benefits to be derived from related prior art devices and practices while avoiding the detriments individually associated therewith.

Further objects and advantages are to provide improved elements and arrangements thereof in an apparatus, and method of manufacture for the purposes described, which are dependable, durable, and fully effective in accomplishing their intended purposes.

These and other objects and advantages are achieved in the connector apparatus of the present invention wherein, in the preferred embodiment, the connector apparatus has a channel formed therein and a first conduit having an orifice is secured in the connector apparatus, and a second conduit mounting a work object is received in the channel and in the orifice formed in the first conduit thereby connecting the work object in fluid communication with the first conduit.

BRIEF DESCRIPTION OF THE DRAWINGS

FIG. 1 is an environmental view of the apparatus of the subject invention showing the irrigating apparatus in full lines at the time of installation and in phantom lines after shrinkage has taken place.

FIG. 2 is a perspective view of the apparatus of the subject invention.

FIG. 3 is a somewhat enlarged, perspective, exploded view of the apparatus of the subject invention.

FIG. 5 is a top plan view of the apparatus of the subject invention.

FIG. 6 is a bottom plan view of the apparatus of the subject invention.

FIG. 7 is a transverse, vertical, sectional view taken along line 7—7 of FIG. 5.

FIG. 8 is a fragmentary, longitudinal, vertical, sectional view taken along line 8—8 of FIG. 2.

DESCRIPTION OF THE PREFERRED EMBODIMENT

Figure 4:
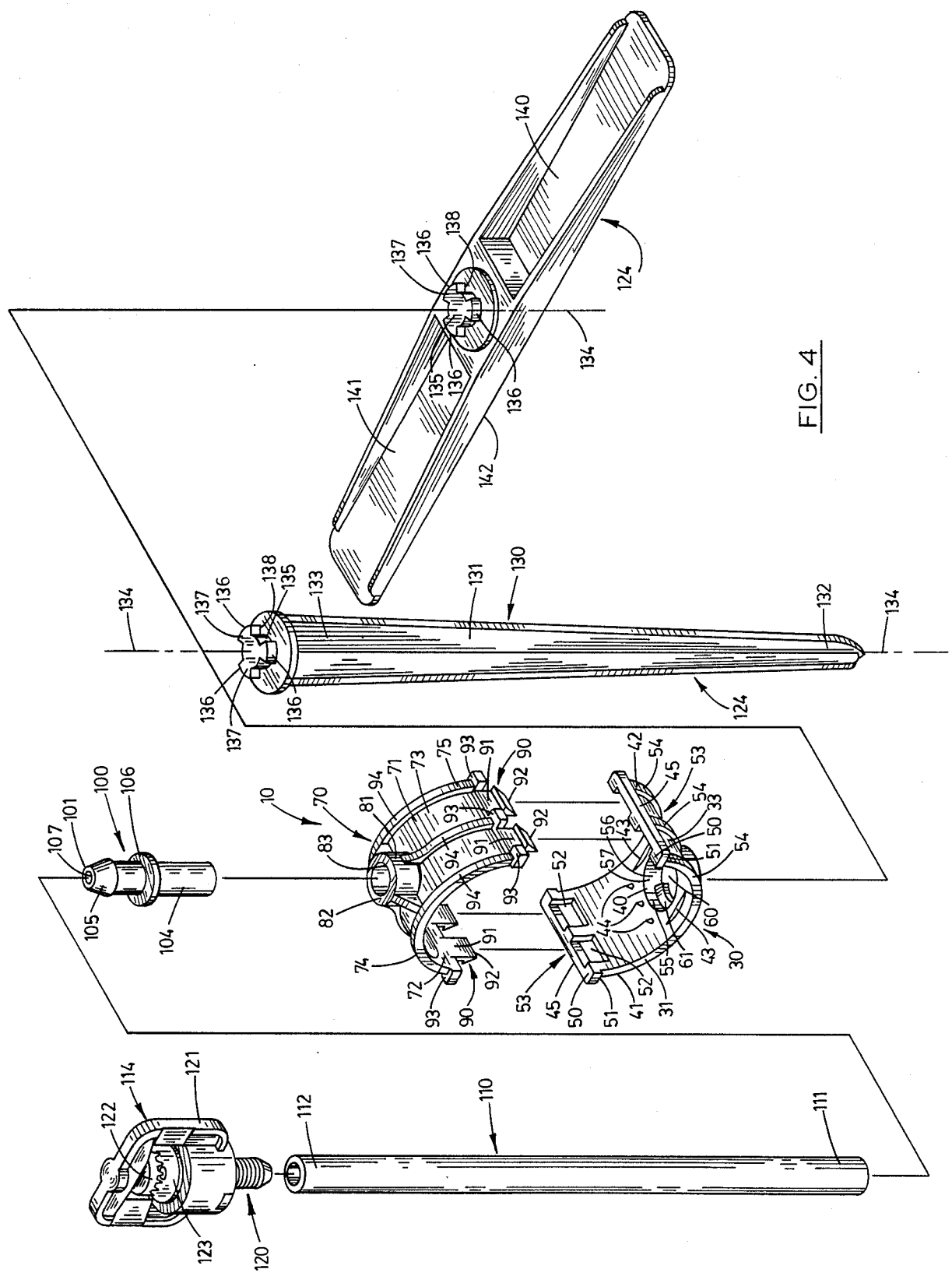
FIG. 4 is a second perspective, exploded view of the apparatus of the subject invention.

Referring more particularly to the drawings, the connector apparatus embodying the principles of the present invention is generally indicated by the numeral 10 in FIG. 3. For illustrative convenience, the apparatus is shown and described herein a typical operative environment. More specifically, and as shown most clearly by reference to FIGS. 1 and 2, the apparatus is shown as an integral part or subassembly of an irrigation system generally indicated by the numeral 11, and which is installed in an agricultural area 12 that has a plurality of plants, herein illustrated as trees 13, growing in rows in predetermined substantially equally spaced relation one to the other. The apparatus 10 as shown and described herein is illustrated as it would be configured if it were utilized as an integral component of an irrigation system which rests upon the surface of the earth 14. However, it should be readily recognized that the apparatus 10 will operate with an equal degree of success when buried under, or alternatively suspended above the surface of the earth.

The apparatus 10 is mounted on a first conduit 20 which is connected in fluid communication with a source of water under pressure, not shown. The first conduit 20 is manufactured typically from a source of commercially available polymers and therefore is formed to shape during an extruding process. The polymers which are utilized to form the first conduit have resilient characteristics, and therefore, a predetermined length of the first conduit may experience stretching and twisting during installation. As best seen by reference to FIG. 1, the first conduit 20 is illustrated in a first position where it would be seen following installation, that is, when it has experienced some stretching, and alternatively in a second phantom position, where it would be seen when, after some period of time, it had recovered to its shorter, "relaxed" length. The first conduit 20 has a substantially circular shaped side wall 21 which has an outside surface 22, and an opposed inside surface 23. The inside surface defines a fluid passageway 24. A plurality of water connection orifices 25 are formed in predetermined spaced relation along the length of the first conduit and are operable to permit water to escape from the first conduit 20 and be dispensed by a sprinkler device which will hereinafter be discussed in greater detail. The first conduit further has a generally upwardly disposed portion 26 and a downwardly disposed portion 27. This is best seen by reference to FIG. 8.

The apparatus 10 has a first portion generally indicated by the numeral 30 and which is defined by a semicircular wall member 31. The wall member 31 has opposed inside and outside surfaces 32 and 33, respectively, and longitudinal and transverse axes which are individually indicated by the lines labeled 34 and 35, respectively. As best seen by reference to FIGS. 3 and 8, a circular shaped orifice 40 is formed substantially centrally of the wall member 31, and the first portion further has first and second ends 41 and 42, respectively. As best understood by a study of FIG. 8, the inside surface 32 of the first portion 30 is adapted closely to hold the downwardly disposed portion 27 of the first conduit 20. The inside surface of the first portion is defined by a radius having a dimension substantially equal to the radial dimension of the first conduit 20. The inside surface 32 further mounts a plurality of projections, herein illustrated as a pair of longitudinally disposed ribs 44, and a multiplicity of spiked projections 45, which are individually mounted in two spaced, substantially parallel, and transversely disposed rows. The projections are individually operable to engage the outside surface 22 of the first conduit 20 and thereby inhibit both rotational and longitudinal movement of the first portion 30 about the first conduit.

Individually mounted on the first and second ends 41 and 42, respectively, of the first portion 30 and disposed in substantially radially extending relation relative to the wall member 31 is a pair of transversely positioned edge members generally indicated by the numeral 45. Each edge member 45 has a top surface 50 and an opposed bottom surface 51. Disposed in close proximity to the bottom surface 51 of each edge member, and individually formed into the wall member 31, of the first portion, are two pairs of substantially rectangular shaped orifices 52. Each edge member and the closely adjacent pair of orifices 52 define first locking members 53 which are individually operable matingly to be engaged by the second portion of the apparatus which will hereinafter be discussed in greater detail. Three substantially equally spaced, and longitudinally disposed reinforcement ribs are mounted on the outside surface 33 of the first portion 30 to provide added strength to the first portion, and a collar 55, which is defined by a wall 56, is mounted to the outside surface 33 in upstanding and circumscribing relation to the orifice 40. The inside surface 57 of the collar 55 defines a passageway 60. A plurality of flanges are individually mounted on the inside surface of the collar and are positioned in the mouth in substantially radially extending relation to the passageway 60 thereby partially occluding same. This is best illustrated by reference to FIG. 6. Each flange 61 has inwardly and outwardly disposed supporting surfaces 62 and 63, respectively, and the radially disposed edges 64 of each of the flanges 61 define a plurality of key ways 65. The operation of the key ways will also be discussed in greater detail hereinafter.

The connector apparatus 10 has a second portion generally indicated by the numeral 70 and which is generally defined by a semi-circular shaped wall member 71. The wall member has an inside surface 72 which is operable to engage the upwardly disposed portion 26 of the first conduit 20. The inside surface is defined by a radius having a radial dimension which is substantially equal to the radial dimension of the first conduit 20. The second portion 70 also has an outside surface 73 and opposed first and second ends 74 and 75, respectively. Moreover, the second portion has longitudinal and transverse axes that are indicated by the lines labeled 76 and 77, respectively. As best seen by reference to FIGS. 5 and 8, an orifice 80 is formed in the second portion and is disposed substantially centrally thereof. A collar, generally indicated by the numeral 81, and which is defined by a wall 82 that is mounted to the outside surface 73, is disposed in substantially upstanding and circumscribing relation to the orifice 80. The collar defines a channel 83 which communicates with the orifice 80. A pair of transversely disposed ribs 84 and a pair of spiked projections 85 are individually mounted on the inside surface 72 of the second portion 70 and are operable to engage the outside surface 22 of the first conduit 20 in a manner similar to the ribbed and spiked projections 43 and 44, respectively, that is, the ribs and spikes are operable to impede or inhibit rotational or longitudinal movement of the second portion 70 about the first conduit. Mounted to the first and second ends 74 and 75, respectively of the second portion and depending downwardly in a substantially normal relation thereto are second locking members generally indicated by the numeral 90. The second locking members include two pairs of longitudinally disposed tab members 91 which individually mount at their respective distal ends a raised or elevated portion, generally indicated by the numeral 92. As best illustrated by reference to FIGS. 3, 6 and 7, the second locking members 90 are individually operable releasably to engage the first locking members 53. More specifically, the forward portion 92 of each of the tab members are operable matingly to be received in the individual orifices 52 which are formed in the wall member 31 of the first portion and are secured from release therefrom by the individual edge members 45. Mounted on and extending in substantially radially extending relation relative to the first and second ends 74 and 75, respectively, are discontinuous transversely disposed edge members 93 which are operable to rest thereagainst the individual edge members 45 when the first and second portions are urged together into mating relation. A plurality of reinforcement ribs 94 are mounted to the outside surface 73 and are adapted to provide strength to the second portion.

A second conduit, generally indicated by the numeral 100, is slidably received in the channel 83 that is defined by the collar 81 in fluid sealing relation. The second conduit has a first end 101, a second end 102, an inside surface 103, and an outside surface 104. A nipple portion 105 is mounted on the first end 101. A flange 106 is mounted on the outside surface 104 and is operable to limit the distance that the second conduit can slidably be received in the channel 83. The flange further operates as a convenient hand hold or gripping surface for an employee, not shown. The inside surface 103 defines a passage 107 which is disposed in fluid communication with the passageway 24 that is defined by the first conduit 20. As should be understood, the outside diameter of the second conduit is such that it sealably mates in the collar 81 and in the water connection hole 25 thereby preventing any leaks.

A third conduit or sprinkler riser 110 is mounted in fluid sealing relation on the nipple portion 105 of the second conduit 100. The sprinkler riser, which is manufactured from a polymer material, has a first end 111 and a second end 112, and further defines a passageway 113. The third conduit is operable to position a sprinkler device 114 in predetermined spaced relation above the surface of the earth 14 and further is adapted to disengage easily from the second conduit when force or impact is applied to same. The nipple portion facilitates this disengagement and further permits the second conduit sealably to be secured in fluid communication with the second conduit. A conventionally designed sprinkler device 114 is mounted on the sprinkler riser 110 and is disposed in fluid communication with the passageway 113. The sprinkler device has a threaded neck portion 120 which is operable screw-threadably to be received in the passageway 113 and connects the sprinkler device in fluid communication with the third conduit. A frame member 121 is mounted to the neck portion and a suitably dimensioned splash plate 122 is mounted on the frame member 121. The threaded neck portion mounts in fluid communication with the passageway 113 a nozzle 123 which is operable to direct a stream of water into the splash plate. The splash plate, of course, causes the water to be distributed outwardly in a predetermined irrigation pattern that is determined by the design of the splash plate employed.

A positioning member, generally indicated by the numeral 124, is operable releasably to be mounted to the first portion and is adapted to locate the sprinkler device 114 in a predetermined position relative to the trees 13. The positioning member takes on several forms. The first form of the positioning member takes on the shape of a stake which is generally indicated by the numeral 130. The stake has a main body 131 with a tapered first end 132 which permits the stake to be driven into the surface of the earth 14. The main body 131 further has a second end 133 and a longitudinal axis generally indicated by the line labeled 134. Mounted on the second end 133 of the stake is a short post 135 which is disposed in substantially coaxial alignment with the longitudinal axis. The post mounts at its distal end a plurality of substantially equally spaced and radially extending key member 136. The post and the individual key members are dimensioned slidably to be received in the passageway 60 and through the individual key ways 65, respectively. The stake is releasably mounted to the first portion 30 when it is rotated about its respective longitudinal axis thereby causing the individual key members releasably to engage in locking relation the individual flange members 61 which are mounted in the mouth of the passageway 60. This is best understood by a study of FIG. 8. The positioning member 124 has a second form which takes on the general shape of a cross arm 140. The cross arm has a main body 141 with an earth engaging surface 142. This particular positioning member would be employed when some side to side movement of the first conduit is desirable or when a hard or rocky earth surface prevents penetration of the stake 130. The cross arm similarly has a post 135, which is operable when rotated about its respective longitudinal axis releasably to be mounted securely on the first portion 30.

OPERATION

The operation of the described embodiment of the present invention is believed to be readily apparent and is briefly summarized at this point.

The operation of the connector apparatus 10 is readily understood by a study of FIGS. 2 and 8. When properly installed on an appropriately dimensioned first conduit 20, the connector apparatus is operable to couple or otherwise join a sprinkler device 114 in fluid communication with the first conduit. The connector apparatus has particular utility when utilized in the manufacture of an irrigation system or apparatus 11 which is utilized in an agricultural area 12 having a plurality of trees 13 disposed in predetermined spaced relation. To employ the connector apparatus 10 in the manufacture of an appropriately dimensioned irrigation apparatus 11, the following events would occur. Initially, the overall length of each row of trees to be irrigated, as well as the individual linear distances between the particular trees would be determined. These linear measurements will be used during another step of the manufacturing process. Following this event, the first conduit 20 would be manufactured using a conventional extrusion process. The linear dimension of the first conduit would be somewhat slightly greater than the previously determined length dimension of the row of trees to be irrigated. This additional length would be attributed to a calculated thermal shrinkage allowance. The thermal shrinkage allowance correctly compensates for normal shrinking which would occur when the first conduit 20 is exposed to low ambient air temperatures. During the extrusion process the manufacturing temperature is maintained substantially constant. The constant temperature of the extrusion process as well as the calculated shrinkage allowance added to the length of the first conduit insures that the first conduit is manufactured to a precise length. Both of these steps insure that the sprinkler devices 114 are not later pulled out of position by expansion or contraction of the first conduit.

After calculating the length of the first conduit, the manufacturing process would begin. During the extrusion process, a number of events will occur substantially simultaneously, however, they will individually be discussed in the paragraphs which follow. During the manufacturing process, a plurality of spaced reference points 143 will be printed on the outside surface 22 of the first conduit 20. These reference points indicate the positioning of that portion of the first conduit 20 relative to the individual trees 13. The reference points are positioned in predetermined locations along the first conduit such that they individually will remain substantially aligned with each of the trees as the first conduit expands and contracts upon exposure to high and low ambient air temperatures. Further, and prior to manufacture, the precise locations of the sprinkler devices between the particular trees 13 to be irrigated will be determined.

Shortly after the first conduit 20 is produced by utilizing the extrusion process, the coupler apparatus 10, and more particularly the first and second portions thereof, 30 and 70, respectively, individually are placed in an appropriate attitude on the upwardly disposed and downwardly disposed portions 26 and 27 of the first conduit, as appropriate, and are thereafter passed into releasable mating engagement together thereby capturing the first conduit between them. The coupler apparatus is mounted at those locations along the first conduit which correspond to the locations of the sprinkler devices 114 relative to the trees to be irrigated. The coupler apparatus 10 is mounted to the first conduit 20 shortly after it is extruded, this process substantially eliminating the possibility that the first conduit has experienced stretching or twisting and insuring that each coupler apparatus 10 is substantially identically positioned in the same attitude on the first conduit. Following the step of mounting the coupler apparatus 10 on the first conduit 20, a water connection orifice 25 is formed in the first conduit 20 and is disposed in substantially coaxial alignment with the channel 83. The formation of the water connection holes is accomplished by a machine and this eliminates many of the problems related to forming the water connection holes under field conditions. The first conduit 20 which has been manufactured in accordance with the steps stated above is thereafter delivered to the field and laid out along the row of trees to be irrigated. After accomplishing this step, the individual reference marks 143 are aligned with the respective trees thereby positioning each coupler apparatus 10 in the precise location earlier calculated for the sprinkler devices 114.

Following the alignment of the reference marks 143, the second conduit 100 would be sealably and slidably received in each of the channels 83, and would be urged through the water connection orifice 25 which has been formed in the side wall 21 of the first conduit 20. The sprinkler riser 110 would then be connected in fluid communication with the second conduit and the threaded neck portion 120 of the sprinkler device 114 would be screw-threadably connected to the first end 111 of the sprinkler riser. It should be understood that the second conduit 100, the sprinkler riser 110, and the sprinkler device 114 will normally be assembled into a single integral unit prior to delivery to the site where installation is taking place. In this fashion, installation can proceed expeditiously. The final step of installation would include mounting the positioning member 124 to the first portion 30 of each coupler apparatus 10 and placing it an appropriate location on the surface of the earth 14. Upon completion of this last step, any twisting of the first conduit 20, which has occurred as a result of installation, would be readily removed inasmuch as each coupler apparatus is positioned in approximately the same attitude on the first conduit 20. When the first conduit 20 returns to its relaxed length some slack will remain in the first conduit, however, this will be attributed to the thermal shrinkage allowance. As earlier discussed, the thermal shrinkage allowance prevents the sprinkler devices 114 from being drawn out of position as the first conduit expands and contracts in response to the ambient air temperature.

Therefore, it will be seen that the coupler apparatus 10 and the method hereof are operable to enhance the speed with which an irrigation system can be installed and provides a fully dependable and practical means by which conventional sprinkler devices can be joined in fluid communication with an appropriate conduit and positioned in precise locations relative to an agricultural area, the apparatus further is operable when properly installed to inhibit displacement or misalignment of sprinkler devices upon contraction or expansion of the conduit upon which they are installed, the apparatus being of both sturdy and dependable construction and relatively inexpensive to manufacture and maintain.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. A method of manufacturing irrigation tubing, adapted to mount sprinklers, for substantially permanent installation in an area wherein a plurality of plants are arranged in predetermined spaced relation, the method comprising the steps of
    manufacturing said tubing in a length sufficient to extend along a plurality of said plants arranged in said predetermined spaced relation;
    calculating an allowance for variations as to length of the tubing under ambient thermal conditions; and
    marking points of reference on the tubing for the positioning of said tubing relative to the plants in said area taking said variation allowance into consideration.

2. The method of claim 1 wherein the manufacturing step includes manufacturing said tubing under substantially controlled temperature conditions.

3. The method of claim 1 wherein the marking step includes marking the points of reference on the tubing at positions corresponding to the positions of said plants taking said variation allowance into consideration.

4. The method of claim 1 wherein the calculating step includes calculating said variation allowance taking into account the ambient seasonal temperature range in said area.

5. The method of claim 4 wherein the calculating step further includes calculating said variation allowance additionally taking into account the spacing of the sprinklers to be mounted on said tubing.

6. The method of claim 5 wherein the calculating step further includes calculating said variation allowance additionally taking into account the amount of exposure of the tubing in said area to radiant solar energy.

7. The method of claim 1 wherein said marking step is performed with said tubing under controlled longitudinal tension.

8. The method of claim 1 including the step of puncturing said tubing at positions for installation of the sprinklers thereon relative to said points of reference.

* * * * *